United States Patent Office 3,748,119

Patented July 24, 1973

3,748,119

PROCESS OF MAKING ACICULAR, STABLE MAGNETIC IRON PARTICLES

Paul Y. Hwang, Palo Alto, and Earl F. Arvin, Belmont, Calif., assignors to Ampex Corporation, Redwood City, Calif.

No Drawing. Filed Dec. 30, 1971, Ser. No. 214,452
Int. Cl. C22b 5/12
U.S. Cl. 75—.5 AA 7 Claims

ABSTRACT OF THE DISCLOSURE

Acicular iron particles are made by doping an acicular ferric oxide with bismuth and a water soluble or dispersible silicon compound and reducing the thus doped oxide to iron at a relatively low temperature. The particles are stabilized by reoxidizing the surface slightly. The use of silicon in addition to bismuth yields iron particles of improved coercivity and acicularity.

SUMMARY OF THE INVENTION

The magnetic particles used in making magnetic recording elements, such as magnetic tapes, generally consist of acicular gamma ferric oxide. It has been long recognized that iron itself would be superior to gamma ferric oxide with respect to signal to noise ratio, magnetic moment and coercive force. However, iron itself suffers from two difficulties. In the first place, it has heretofore been almost impossible to produce iron particles of the desired acicular shape. If one starts with acicular iron oxide particles and reduces them, invariably there is some sintering and the desired acicular shape is lost. The second deficiency is that iron particles in the sub-micron range ordinarily used in making magnetic tapes are pyrophoric. These two deficiencies of iron have prevented any substantial use of iron in making magnetic recording elements, despite the recognized advantages of pure iron.

It has previously been found (U.S. Pat. 3,623,859) that if one starts with acicular iron oxide (either red alpha ferric oxide or yellow hydrated ferric oxide) and dopes the iron with a small amount of a bismuth salt and reduces the iron oxide under relatively mild conditions, the acicular shape is preserved. Further, if one cautiously admits air to the cooled, reduced iron oxide particles, the surface of the iron is mildly oxidized and the oxide surface stabilizes the iron, preventing it from being pyrophoric.

Although bismuth doping represents a substantial advance in the art, the product is somewhat sintered at practical reduction rates. This leads to a relatively low coercivity and some loss of acicularity. Increasing the bismuth doping level did not solve these problems.

It has now been found that if one employs a small amount of a water soluble or dispersible silicon compound along with the bismuth greatly improved results are obtained. The reduction can be run at a higher temperature for a shorter length of time increasing the production rate. Sintering is greatly reduced thus maintaining acicularity and yielding a product of enhanced coercivity.

Any soluble bismuth salt can be used and preferably one employs a chelating agent to hold the bismuth in solution. The amount of bismuth salt is selected so that the percentage of bismuth based on the iron (both as metal) is from about 1 to 20% by weight. The optimum percentage is about 5%. Any water soluble or dispersible silicon compound may be employed. The silicon doping level is preferably at a Si:Fe ratio of between 0.1:100 and 10:90 by weight. The thus doped iron oxide is then reduced in a hydrogen atmosphere at a temperature of not over 500° C. and preferably not over 350° C. There is no real lower limit as to temperature but at low temperatures, the reaction goes very slowly so that from a practical standpoint, one should employ a temperature of at least 250° C. in order to avoid impractically long reaction times although temperatures as low as 200° C. can be employed. A temperature of about 350° C. is optimum. After the reaction has gone to completion the reactor is cooled. A mixture of 1% air and 99% nitrogen or carbon dioxide is then admitted to the reactor and at intervals of 30 to 45 minutes the percentage of air in the mixture is doubled. At the same time the temperature in the reactor is observed and if it rises to more than about 50° C., the increases in air flow are suspended until it drops again. After four or five hours, pure air is flowing through the reactor and the iron particles can now be removed and made into tape or other magnetic recording media.

The starting material for the synthesis is commercially available acicular hydrated yellow iron oxide. It is convenient to dehydrate this to red alpha ferric oxide by heating it to about 350° C. before it is doped with bismuth but it is also possible to dope the yellow iron oxide directly, prior to dehydration.

The doping is accomplished by mixing the dry iron oxide with a solution of a bismuth salt and the silicon compound. The bismuth salt should be one which is soluble in water or other solvents which do not attack the iron oxide. Bismuth nitrate is suitable for this purpose, but bismuth nitrate has a tendency to hydrolize immediately upon being mixed with water and precipitate out the bismuth. Therefore, it is preferable that a chelating agent be used to maintain the salt in solution and prevent it from reacting with water. Suitable chelating agents include mannitol and sorbitol. The minimum solution volume is chosen so that when the solution of the bismuth salt and silicon compound is mixed with the iron oxide, the oxide is wet all over. A solution volume of about 70 ml. per hundred grams of red oxide is about optimum for tray drying since with a lower volume it is difficult to wet all of the oxide evenly. Preferably a much larger volume of water is used to make a slurry and the slurry is spray dried.

In preparing the bismuth solution, a suitable technique is to use about 50 grams of mannitol and 500 ml. of cold water. A quantity of 81 grams of bismuth nitrate, $Bi(NO_3)_3 \cdot 5H_2O$ is then dissolved in this solution. 55 ml. of this solution diluted to 70 ml. with water is used to dope 100 grams of red iron oxide to give the desired bismuth to iron percentage. The silicon solution or dispersion can be mixed with the bismuth solution or it can be added separately to the iron oxide.

The decomposition of bismuth nitrate doped iron oxide to bismuth oxide doped iron oxide can be carried out in a small electrically heated kiln or reactor at the desired temperature range, preferably after pelletizing the doped oxide. The reactor is charged with the bismuth doped iron oxide and heated and purged with a stream of nitrogen or $CO_2$. Hydrogen gas is now introduced and the temperature maintained at the desired reduction temperature. Preferably the hydrogen is dried before introduction, since the presence of a small amount of water increases the reduction time sufficiently to cause some sintering and loss of desired magnetic properties. Normally the reduction requires about 6 hours.

DESCRIPTION OF THE PREFERRED EMBODIMENTS

The following non-limiting examples illustrate preferred embodiments of the invention.

Example 1

A commercial yellow iron oxide, FeOOH with average particle dimensions of 0.07 micron in width and 0.50 micron in length is dehydrated at 350° C. to red oxide, alpha $Fe_2O_3$.

Five grams of mannitol are dissolved in 50 ml. of water. 8.1 grams of $Bi(NO_3)_3 \cdot 5H_2O$ are dissolved in this solution, with the mannitol acting as a chelating agent to hold the bismuth in solution. Five ml. of this solution is mixed with 10 grams of alpha $Fe_2O_3$. The wet oxide is dried at 110° C. and then heated to 375° C. in a nitrogen atmosphere to decompose the $Bi(NO_3)_3$ to $Bi_2O_3$.

The alpha $Fe_2O_3$ doped with $Bi_2O_3$ is mixed with a solution containing 0.4 gram of $Na_2SiO_3 \cdot 9H_2O$ in 5 ml. of water. The resulting paste is dried at 110° C.

The weight ratios of Bi:Fe and Si:Fe in this mixture are 5:95 and 0.4:70.0, respectively.

Two hundred mg. of this mixture is placed in a 16 mm. diameter platinum crucible in a reactor. The sample is heated to 350° C. in a stream of $H_2$ and reduced to iron. The reduction requires about 8 hours. The sample is cooled to room temperature and a mixture of 1% air and 99% $N_2$ is then passed through the reactor and the percentage of air is gradually increased. After 3–4 hours, pure air is admitted. The iron particle now is non-pyrophoric and can be removed from the reactor.

The powder has a saturation moment of 133 emu/g., remanence moment of 61.8 emu/g. and $H_c$=1220 oe.

Example 2

The procedure of Example 1 was repeated, except that the alpha $Fe_2O_3$ doped with $Bi_2O_3$ is mixed with a solution containing 0.2 gram of $Na_2SiO_3 \cdot 9H_2O$ in 10 ml. of water. The weight ratio of Si:Fe in this mixture is 0.2:70.0.

The reduction was completed in 4 hours.

The powder had a saturation moment of 131 emu/g., remanence moment of 57.1 emu/g. and $H_c$=1120 oe.

Example 3

The procedure of Example 1 was repeated except that the $Bi(NO_3)_3$-mannitol solution is diluted with an equal volume of water. Hence, the weight ratios of Bi:Fe and Si:Fe in this mixture are 2.5:97.5 and 0.5:70.0, respectively.

It took 6 hours to complete the reduction. The powder had a saturation moment of 127 emu/g., remanence moment of 52.1 emu/g. and $H_c$=1000 oe.

Example 4

Five grams of $Bi_2O_3$ doped alpha $Fe_2O_3$ which is prepared according to the procedure in Example 1 are slurried into 100 ml. water. 0.5 g. of $Na_2SiO_3 \cdot 9H_2O$ is dissolved in 50 ml. water and added to the iron oxide slurry. The mixture is then mixed with a solution containing 5 ml. of acetic acid in 50 ml. water. This forms an $H_2SiO_3$ gel which is uniformly adsorbed on the surface of iron oxide particles. The slurry is filtered and washed to remove the soluble salt sodium acetate. The residue is dried at 110° C. The weight ratio of Si:Fe in this material is 1:70.

The Bi-Si doped oxide is reduced and stabilized with the same procedure as in Example 1 except that the reduction temperature is 320° C. and takes 6.5 hours to complete the reduction. The product had a saturation moment of 150 emu/g., remanence moment of 69.0 and $H_c$=1020 oe.

Example 5

The procedure of Example 1 was repeated except that the sodium silicate solution was replaced with a dimethylpolysiloxane emulsion (Dow-Corning Antifoam AF Emulsion) to provide a Si:Fe ratio of 4:96.

The product has a saturation moment of 124 emu/g., a remanence moment of 54.0 emu/g. and $H_c$=1150 oe.

Example 6

The procedure in Example 5 was scaled-up to large scale synthesis; 2.5 lbs. of mannitol are dissolved in 25 lbs.

of water at 50° C. and 4.08 lbs. of $Bi(NO_3)_3 \cdot 5H_2O$ are dissolved in this solution. The solution is diluted with 200 lbs. of water. To the dilute solution, 50 lbs. of alpha $Fe_2O_3$ are added. The mixture is agitated to a homogeneous slurry and then spray-dried. The spray-dried powder is heated to 750° C. in a rotary kiln in an $N_2$ atmosphere to decompose the $Bi(NO_3)_3$ to $Bi_2O_3$. This yielded 39 lbs. of $Bi_2O_3$ doped alpha $Fe_2O_3$, which is again slurried into 150 lbs. of water. To this slurry, 6.62 lbs. of Dow-Corning antifoam AF Emulsion are added. The mixture is spray-dried again.

The dry powder is wetted with a small amount of water and pelletized in a Pellet Mill with a ⅜" diameter x ½" die. The pellets are loaded into a 2" diameter x 18" long stainless steel cylinder reactor and purged with pure $CO_2$. The cylinder is then made to travel through a 24" electrical furnace at a speed of 1½" per hour. Temperature at the middle of the furnace is controlled at 375° C. and $H_2$ gas flows through the cylinder at 0.7 c.f.m. opposite to the cylinder traveling direction. When the cylinder travels through the whole length of the furnace, the reduction is completed. Then the metallic particles in the tube are stabilized with a mixture of air/$CO_2$. At the beginning the air/$CO_2$ ratio is 1:99 and gradually changes to pure air over a period of 24 hours.

The product has a saturation moment of 139 emu/g., remanence moment of 54.3 emu/g. and $H_c$=1000 oe.

Example 7

Dissolve 0.75 lb. of mannitol in 7.5 lbs. of water. The resulting solution is heated to 55° C., then 1.22 lbs. of $Bi(NO_3)_3 \cdot 5H_2O$ are added. The solution is then diluted with 50 lbs. of water. A sodium silicate solution is prepared by dissolving 0.61 lb. of $Na_2SiO_3 \cdot 9H_2O$ in 9.3 lbs. of water. The two solutions are mixed together. To the mixed solution, 15 lbs. of alpha $Fe_2O_3$ are added. The resulting slurry is mixed with a high speed agitator and spray-dried.

The spray-dried powder is heated to 750° C. in a rotary kiln under $N_2$ for 10 minutes to decompose the $Bi(NO_3)_3$ to a bismuth oxide. It is then wetted with a small amount of water and pelletized to ⅜" diameter x ½" cylinders in a Pellet Mill.

The pellets are reduced and passivated with the same procedure as described in Example 6 except that the reduction temperature is 350° C.

The product has a saturation moment of 140 emu/g., remanence moment of 60.0 emu/g. and $H_c$=1100 oe.

Example 8

Five grams of yellow iron oxide, FeOOH, and 2.75 ml. of bismuth nitrate solution, as described in Example 1, are mixed together. The mixture is dried at 110° C. and then heated to 400° C. to dehydrate the FeOOH to $Fe_2O_3$ and to decompose $Bi(NO_3)_3$ to $Bi_2O_3$.

One gram of the powder from the above is mixed with a solution containing 0.25 gram of $Na_2SiO_3 \cdot 9H_2O$ in 1.5 ml. of water. The resulting paste is dried at 110° C.

The weight ratios of Bi:Fe and Si:Fe in this mixture are 6.5:93.5 and 0.5:70.0, respectively.

Two hundred mg. of this mixture is reduced and stabilized under the same conditions as in Example 1.

The powder has a saturation moment of 124 emu/g., a remanence of 45.0 emu/g. and $H_c$=850 oe.

We claim:

1. A process for producing acicular iron particles comprising doping material selected from acicular yellow ferric oxide and acicular red ferric oxide with bismuth and a water soluble or dispersible silicon compound wherein the amount of bismuth to iron is from about 1 to 20% and the amount of silicon to iron is from about 0.1% to 10% by weight, and reducing the thus doped ferric oxide to iron in a stream of hydrogen at a temperature of from 200° C. to 500° C.

2. The process of claim 1 wherein the oxide is doped by wetting the surface of the iron oxide particle with an aqueous solution of a bismuth salt and a silicon compound.

3. The process of claim 2 wherein the oxide is first doped with an aqueous solution of bismuth nitrate stabilized with a chelating agent and then doped with an aqueous dispersion of dimethylpolysiloxane.

4. The process of claim 1 wherein after reduction the iron is slowly oxidized to produce an oxidized surface, rendering said iron particles non-pyrophoric.

5. The process of claim 4 wherein the iron particles are cooled to about room temperature after reduction, and a mixture containing about 1% air and 99% of a gas selected from $CO_2$ and nitrogen is introduced over the particles and wherein the percentage of air is slowly increased, said increase in air flow being restricted to produce a temperature of not over 50° C., until pure air can flow over the product without causing a temperature rise.

6. The process of claim 1 wherein the reaction is conducted at a temperature of about 350° C.

7. The process of claim 1 wherein the silicon compound is sodium silicate.

References Cited

UNITED STATES PATENTS

| | | | |
|---|---|---|---|
| 3,623,859 | 11/1971 | Aldridge | 75—.5 AA |
| 2,879,154 | 3/1959 | Campbell | 75—.5 BA |
| 3,520,676 | 7/1970 | Stahr | 75—.5 AA |
| 2,578,800 | 12/1951 | Hamister | 75—.5 BA |
| 3,348,982 | 10/1967 | Dunton | 148—105 |
| 3,634,063 | 1/1972 | Hwang | 75—.5 AA |
| 3,627,509 | 12/1971 | Van der Giessen et al. | 75—.5 AA |

GEORGE T. OZAKI, Primary Examiner

U.S. Cl. X.R.

75—.5 BA; 148—1.6, 105; 252—62.55